United States Patent [19]
Siligoni et al.

[11] Patent Number: 4,841,565
[45] Date of Patent: Jun. 20, 1989

[54] MONOLITHICALLY INTEGRATABLE TELEPHONE CIRCUIT FOR FEEDING A SUBSCRIBER'S TELEPHONE LINE

[75] Inventors: Marco Siligoni, Vittuone; Vanni Saviotti, Monza; Emilio Lorena, Parona, all of Italy

[73] Assignee: SGS Microelecttronica SpA, Milan, Italy

[21] Appl. No.: 857,487

[22] Filed: Apr. 30, 1986

[30] Foreign Application Priority Data

Apr. 30, 1985 [IT] Italy .................. 20549 A/85

[51] Int. Cl.[4] .................................. H04M 19/00
[52] U.S. Cl. ........................... 379/413; 379/324
[58] Field of Search ......... 379/395, 405, 413; 412, 379/345, 344, 399, 400

[56] References Cited

U.S. PATENT DOCUMENTS

| | | |
|---|---|---|
| 4,272,656 | 6/1981 | Nishikawa . |
| 4,358,645 | 11/1982 | Brown .................. 379/405 X |
| 4,476,350 | 10/1984 | Aull et al. .............. 379/413 X |
| 4,540,852 | 9/1985 | Albouy et al. . |
| 4,558,272 | 12/1985 | Grosch . |
| 4,661,978 | 4/1987 | Hirata .................. 379/394 |
| 4,782,507 | 11/1988 | Siligoni et al. ............ 379/27 |

FOREIGN PATENT DOCUMENTS

| | | |
|---|---|---|
| 0152178 | 8/1985 | European Pat. Off. . |
| 0005670 | 1/1986 | Japan ................... 379/413 |
| 2079499 | 1/1982 | United Kingdom . |

OTHER PUBLICATIONS

"Two-Slope Resistive Feeder for Telephone Line Interface Circuits", IBM Technical Disclosure Bulletin, vol. 25, No. 11A, Apr. 1983.

*Primary Examiner*—Jin F. Ng
*Assistant Examiner*—Randall S. Vaas
*Attorney, Agent, or Firm*—Wenderoth, Lind & Ponack

[57] ABSTRACT

A telephone circuit, which may be monolithically integrated, for feeding a subscriber's telephone line which is coupled via the circuit to a supply voltage generator. The circuit supplies the line with an impedance having a first predetermined value up to a given value of the line current, beyond which is supplies the line with an impedance of a second value greater than the first. The circuit is electrically equivalent to a voltage generator, identical to the supply voltage generator, having circuit components solely of the resistive type connected in series therewith.

1 Claim, 4 Drawing Sheets

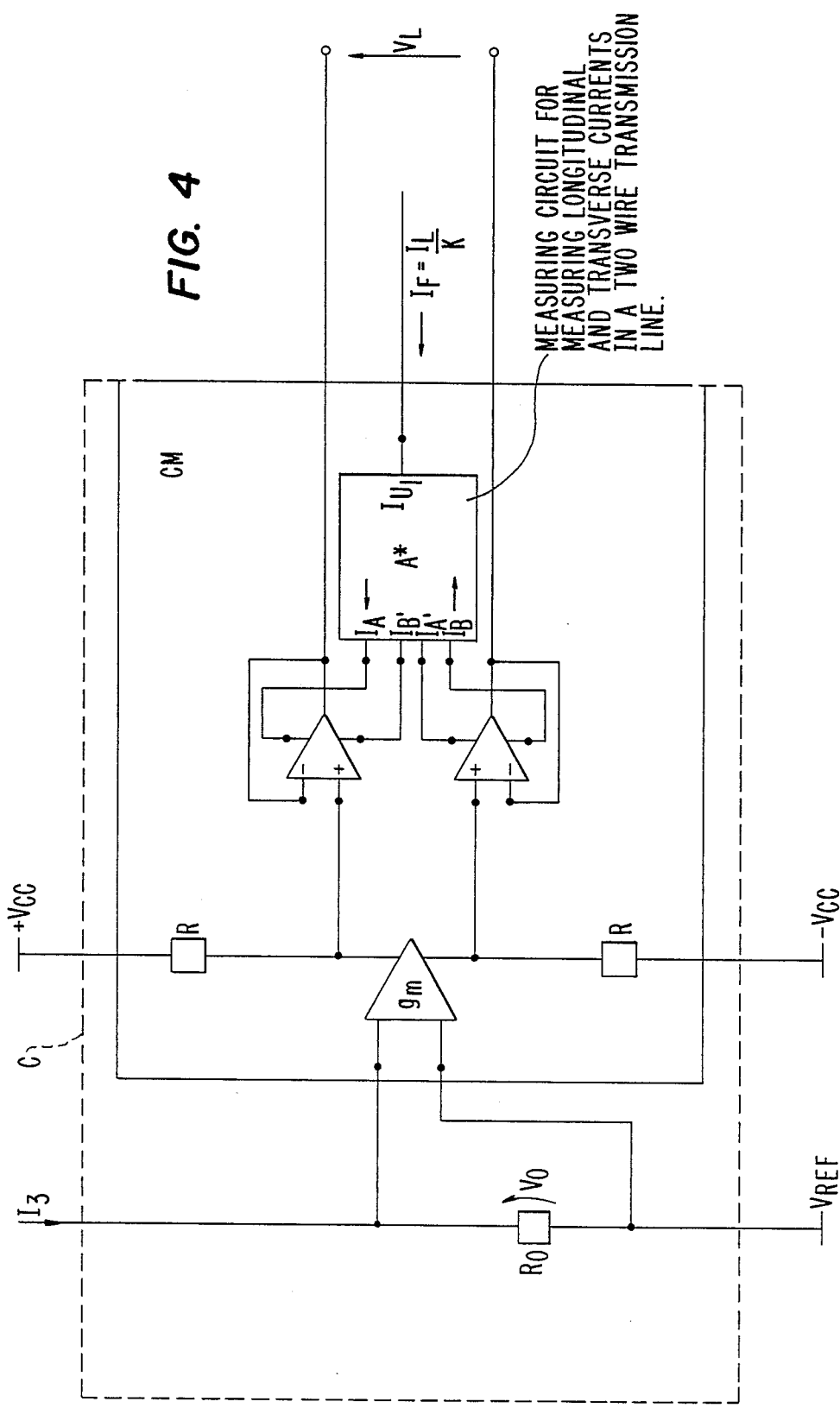

MONOLITHICALLY INTEGRATABLE TELEPHONE CIRCUIT FOR FEEDING A SUBSCRIBER'S TELEPHONE LINE

BACKGROUND OF THE INVENTION

The present invention relates to telephone circuits for feeding a subscriber's telephone line. More particularly, the present invention relates to monolithically integratable circuits designed to be inserted in a telephone interface circuit between a subscriber's telephone line and exchange control components.

In telephone exchanges of the electromechanical type which are still in operation, in which the control components drive the line devices by means of inductive couplings devices, a subscriber's telephone line is generally supplied via a circuit comprising two identical resistances $R_{DC}$ which couples the wires of the line, via a resistance in each case, to two terminals of a constant supply voltage generator $V_{BAT}$. In most cases, this generator takes the form of a 48V battery.

The voltage $V_L$ supplied to the subscriber's telephone line, expressed as a function of the line current $I_L$, which is determined by the line load, is therefore:

$$V_L = V_{BAT} - 2R_{DC}I_L.$$

This relationship defines the external current-voltage characteristic of the supply circuit at its line connection terminals.

The characteristic of the circuit, shown in Cartesian form, taking the values of the line current $I_L$ as the abscissa and the values of the voltage $V_L$ supplied to the line as the ordinate, for positive abscissa and ordinate values, is therefore a section, of a straight line having the relationship mentioned above as its equation and is shown in FIG. 1 of the drawings by a dashed line segment.

If the line current is zero, then the voltage $V_L$ is equal to the battery voltage $V_{BAT}$.

The slope of the characteristic of line 1 with respect to the abscissa axis is determined by the overall value $2R_{DC}$ of the resistances via which the line is coupled to the terminals of the supply voltage generator $V_{BAT}$. By selecting, or devising, a specific current-voltage characteristic for a telephone circuit designed to supply a subscriber's telephone line, whose load $R_L$ increases with increases in its length, it is possible to determine the impedance of the circuit seen from the line and ensure that the line current $I_L$ has, as a function of the various line lengths contained in the entire telephone network, a value lying between predetermined values, and it is also possible to accurately predetermined the values of the power dissipated at the exchange as a function of the line length. The characteristic of line 1 is not only completely adequate for normal telephone network requirements, even though it is provided using an extremely simple circuit, but is also the most advantageous external characteristic for a telephone supply circuit since it enables full use of the voltage $V_{BAT}$ supplied by the supply voltage generator for the maximum line lengths.

The introduction of partially or fully electronic telephone exchanges, in which functions previously carried out in subscriber's sets were carried out by means or electronic circuits inserted in interface circuits in series with the line itself when the subscriber's line was connected, led to the problem of supplying these electronic circuits in addition to the subscriber's line. In effect, an electronic circuit requires a minimum operating voltage, whose value increases, inter alia, with an increase in the intensity of the current flowing in the circuit itself, since, if the exchange comprises electronic circuits inserted in series with a subscriber's telephone line, it must be borne in mind that a portion $V_{DROP}$ of the supply voltage $V_{BAT}$ may not be supplied to the line as it is necessary for the operation of these circuits.

Persons skilled in the art currently design both the electronic circuits to be inserted in series with a subscriber's telephone line, and the supply circuits for exchanges of an electronic type, in such a way that it is possible to maintain a characteristic which is still rectilinear for these supply circuits with an impedance which is equal to the impedance provided on the line by a non-electronic circuit for exchanges of the electromechanical type, while attempting to reduce the inevitable $V_{DROP}$ as much as possible.

A characteristic of the type shown in FIG. 1 by the line segment 2 which parallel to the characteristic of line 1 and located as close as possible thereto is consequently used.

Although the characteristic of line 2 entails higher overall design costs, it enables the achievement of electronic supply circuits which are compatible, from the point of view of the line, with non-electronic circuits. For a zero line current $I_L$, the voltage $V_L$ supplied to the line is:

$$V_L = V_{BAT} - V_{DROP}$$

SUMMARY OF THE INVENTION

The object of the present invention is to provide a telephone circuit, which may be monolithically integrated, for feeding a subscriber's telephone line, and which is designed to be inserted in a monolithically integrated interface circuit between a subscriber's telephone line and exchange control components and which, with respect to known circuits of electronic type, has improved compatibility with telephone systems of the non-electronic type.

This object is achieved by the telephone circuit for feeding a subscriber's telephone line, set out and characterized in the claims attached hereto.

This object may be effected by providing a monolithically integratable telephone circuit for feeding a subscriber's telephone line, comprising a first and a second terminal respectively connected to a first and a second terminal of a supply voltage generator and a third and a fourth terminal respectively connected to a first and a second wire of said telephone line, wherein said circuit supplies said subscriber's telephone line, between said third and fourth terminals, with an impedance having a first predetermined value for values of the current supplied to said line below a predetermined current value and having a second predetermined value, which is higher than said first predetermined value, for at least a range of values of the current supplied to said line above said predetermined current value and wherein, when said current supplied to said line is in said range of current values above said predetermined current value, said circuit is electrically equivalent, between said third and fourth terminals, to a voltage generator, equivalent to said supply voltage generator and series connected resistive circuit components.

This object may also be effected by providing a monolithically integratable telephone circuit for feeding a subscriber's telephone line, comprising:

a current mirror circuit having an input and first and second outputs; a transistor having first, second and control terminals; an operational amplifier having an output terminal and first and second input terminals;

wherein said input of said current mirror circuit is connected to said second terminal of said transistor; said control terminal of said transistor is connected to said output terminal of said operational amplifier; said first terminal of said transistor is connected to said second input terminal of said operational amplifier and is connected to a voltage reference via a first resistance; said first input terminal of said operational amplifier is connected to said voltage reference via a voltage generator; said first and second outputs of said current mirror circuit are respectively connected to said second input terminal of said operational amplifier and to said voltage reference via a second resistance;

said circuit further comprising a circuit means for coupling of said subscriber's telephone line to a supply voltage generator having first and second terminals, said circuit means having first and second terminals connected to said first and second terminals of said supply voltage generator and having third and fourth terminals connected to a first and a second wire respectively of said subscriber's line; said circuit coupling means comprising at least one additional voltage generator for outputting a voltage in accordance with a resultant voltage across said second resistance, and a circuit current transducer means, inserted between at least one of the first and second terminals connected to said subscriber's telephone line and said input of said current mirror circuit.

BRIEF DESCRIPTION OF THE DRAWINGS

The invention will be described in detail below, purely by way of non-limiting example, with reference to the attached drawings, in which:

FIG. 4 illustrates the coupling means CM and overall circuit C of FIG. 2.

Corresponding components are given the same reference numerals and letters in the drawings.

DESCRIPTION OF THE PREFERRED EMBODIMENT

Figure 1:
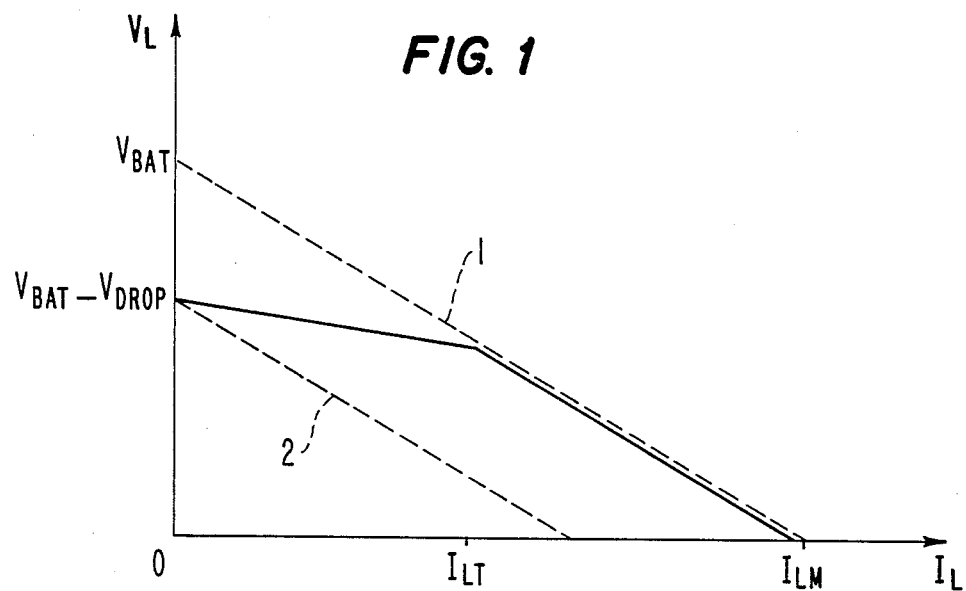
FIG. 1 is a Cartesian representation of the new external current-voltage characteristic of a telephone supply circuit according to the present invention and of the known characteristics described above.

FIG. 1 shows the external voltage-current characteristic of a telephone supply circuit in accordance with the present invention by a continuous line and the known prior art characteristics by lines 1 and 2.

The three characteristics all relate to the same supply voltage value $V_{BAT}$ and the same connection requirements of the subscriber.

The characteristic of the circuit in accordance with the present invention is shown by two rectilinear lines having different slopes, the first, having a smaller slope, connecting the point of the ordinate axis having an ordinate value $V_{BAT}-V_{DROP}$ to a point having a predetermined abscissa value $I_{LT}$ and an ordinate value identical to the value corresponding to this current value in accordance with the characteristic of line 1.

The second section coincides with the characteristic of line 1 from the abscissa point $I_{LT}$ to the abscissa point $I_{LM}$ at which the characteristic of line 1 meets the abscissa axis.

For the purpose of clarity, this second section is shown by two adjacent lines, one dashed and the other continuous, which should be considered to coincide in reality.

A telephone supply circuit in accordance with the present invention, having this disjointed characteristic, provides at the telephone line which it supplies an impedance having a first predetermined value for line current values between 0 and $I_{LT}$ and a second, higher value, identical to the impedance value supplied to the line by a telephone supply circuit of a non-electronic type, for line current values between $I_{LT}$ and $I_{LM}$.

In this case as well, the value $V_{DROP}$ which is identical to the value relating to characteristic of line 2 in FIG. 1, is selected so as to ensure the correct operation of all the electronic circuits which are connected in series in the exchange to the subscriber's telephone line supplied by a circuit in accordance with the present invention.

However, at equal $V_{DROP}$ values, the external characteristic of a telephone supply circuit in accordance with the present invention, ensures, with respect to the prior art characteristic of line 2, higher values for the voltage $V_L$ and the current $I_L$ in the same subscriber's telephone line. This is particularly important when the line is long and the line current $I_L$ is consequently reduced.

Moreover, a supply circuit in accordance with the present invention, whose voltage-current characteristic coincides in part with the characteristic of line 1 and is therefore more similar to this than to the characteristic of line 2, has, leaving aside negligible impedance differences, improved compatibility, with respect to current electronic supply circuit, with telephone systems which are not fully electronic.

Figure 2:
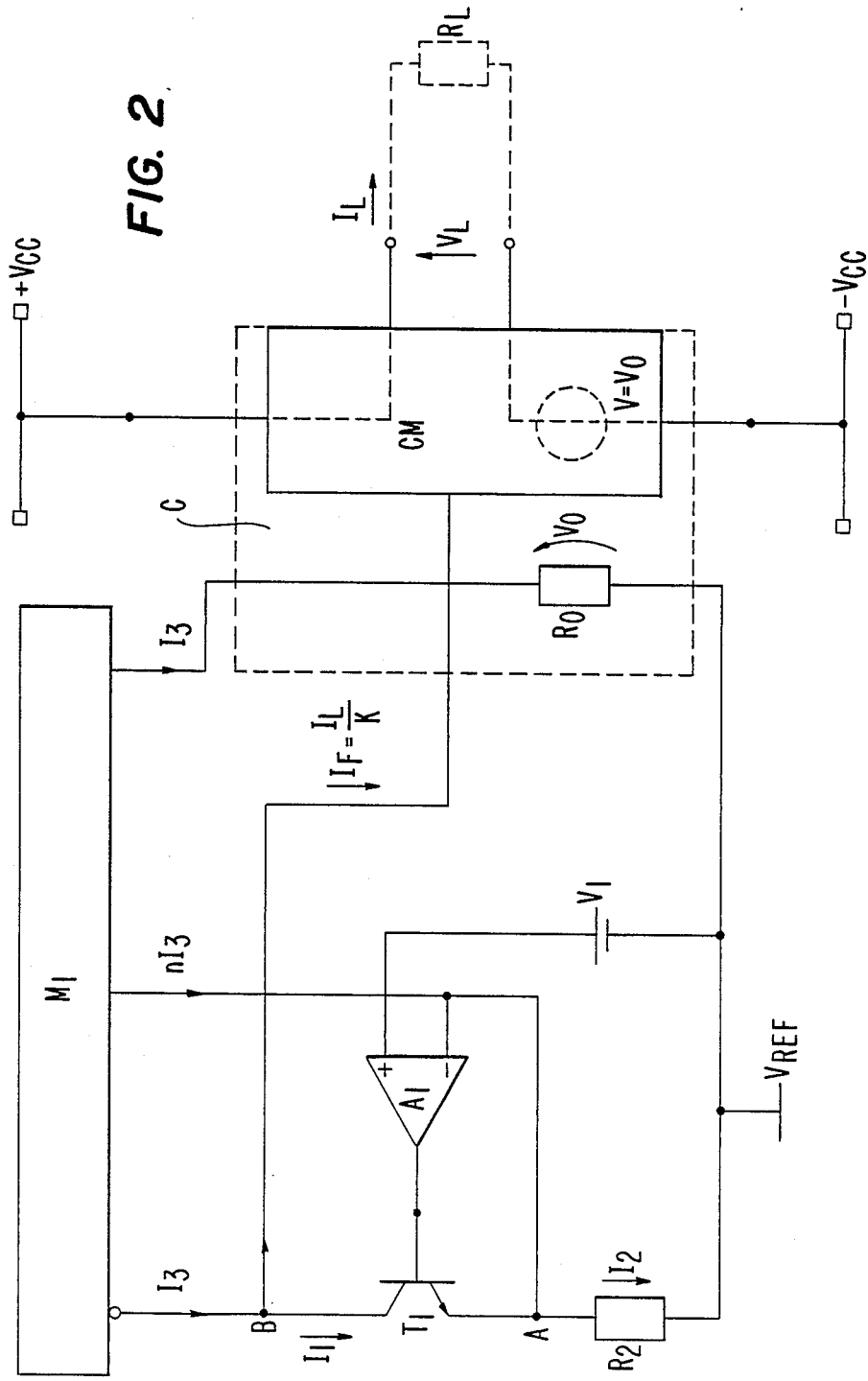
FIG. 2 is a diagram of a telephone circuit in accordance with the present invention for feeding a subscriber's telephone line.

A telephone supply circuit in accordance with the present invention, comprises, as shown in FIG. 2, a current mirror circuit $M_1$, having an input branch and a first and a second output branch. The input branch is shown by a circle.

The current flowing in the first output branch is proportional, in accordance with a constant factor of proportionality n, to the current flowing in the input branch, which is, however, equal to the current flowing in the second output branch.

The supply circuit also comprises an operational amplifier $A_1$ and a bipolar NPN transistor $T_1$. The input branch of the current mirror circuit $M_1$ is connected to the collector terminal of the transistor $T_1$, whose base terminal is connected to the output terminal of the operational amplifier $A_1$ and whose emitter terminal is connected at a circuit node A to both the inverting input of the operational amplifier $A_1$ and, via a resistance $R_2$, to a voltage reference $V_{REF}$.

The non-inverting input of the operational amplifier $A_1$ is connected to the voltage reference $V_{REF}$ by a constant voltage generator $V_1$.

The first and the second output branch of the current mirror circuit $M_1$ are respectively connected to the inverting input of the operational amplifier $A_1$ and, via a resistance $R_0$, to the voltage reference $V_{REF}$.

A telephone supply circuit of the invention also comprises circuit means for coupling of the telephone line to be supplied to a supply voltage generator $V_{BAT}$.

This circuit means, shown in FIG. 2 by a single block CM, has a first and a second terminal for connection to the positive terminal $+V_{cc}$ and the negative terminal $-V_{cc}$ respectively of the supply voltage generator (which typically supplies a voltage $V_{BAT}$ of 48V) and has a first and a second terminal for coupling of the circuit to the subscriber's telephone line which is shown symbolically in dashed lines in FIG. 2 by a load $R_L$.

This circuit coupling means CM comprises a generator of voltage V, controlled by the voltage $V_0$ at the terminals of the resistance $R_0$.

As shown in FIG. 2, $V=V_0$.

The resistance $R_0$ and the block CM are symbolically contained in a closed dashed line C which also represents possible circuit components, of a type known to persons skilled in the art, not shown directly in FIG. 2

The simplest circuit configuration which the circuit coupling means could have in theory is then shown within the block CM by dashed lines.

These circuit means are in practice embodied using relatively complex circuits, as known to persons skilled in the art, since they carry out a number of functions.

Figure 3:
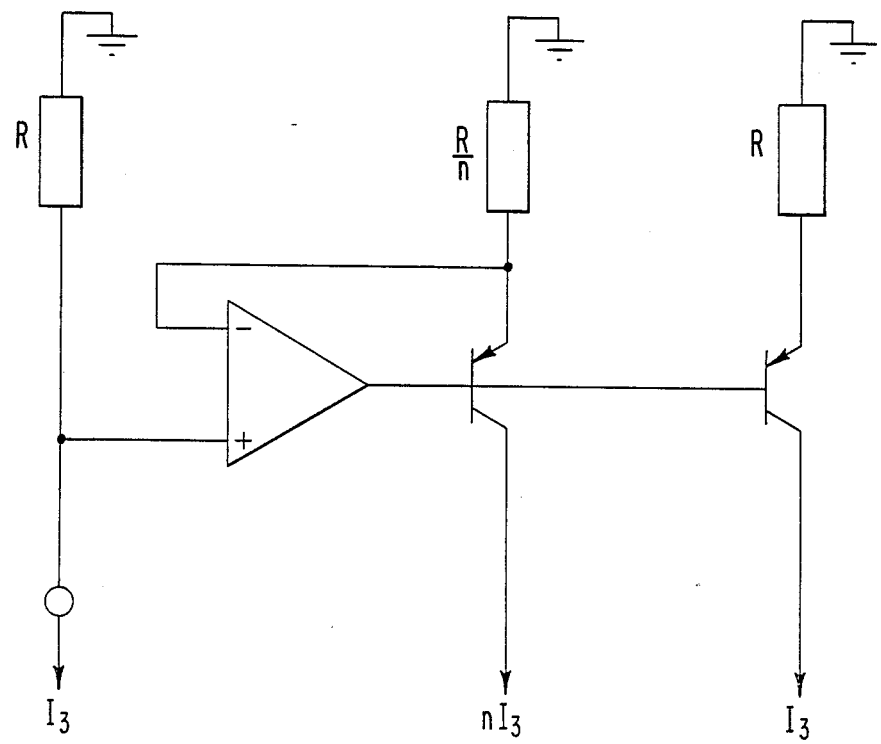
FIG. 3 illustrates an example of the current mirror $M_1$ of FIG. 2.
Figure 5:
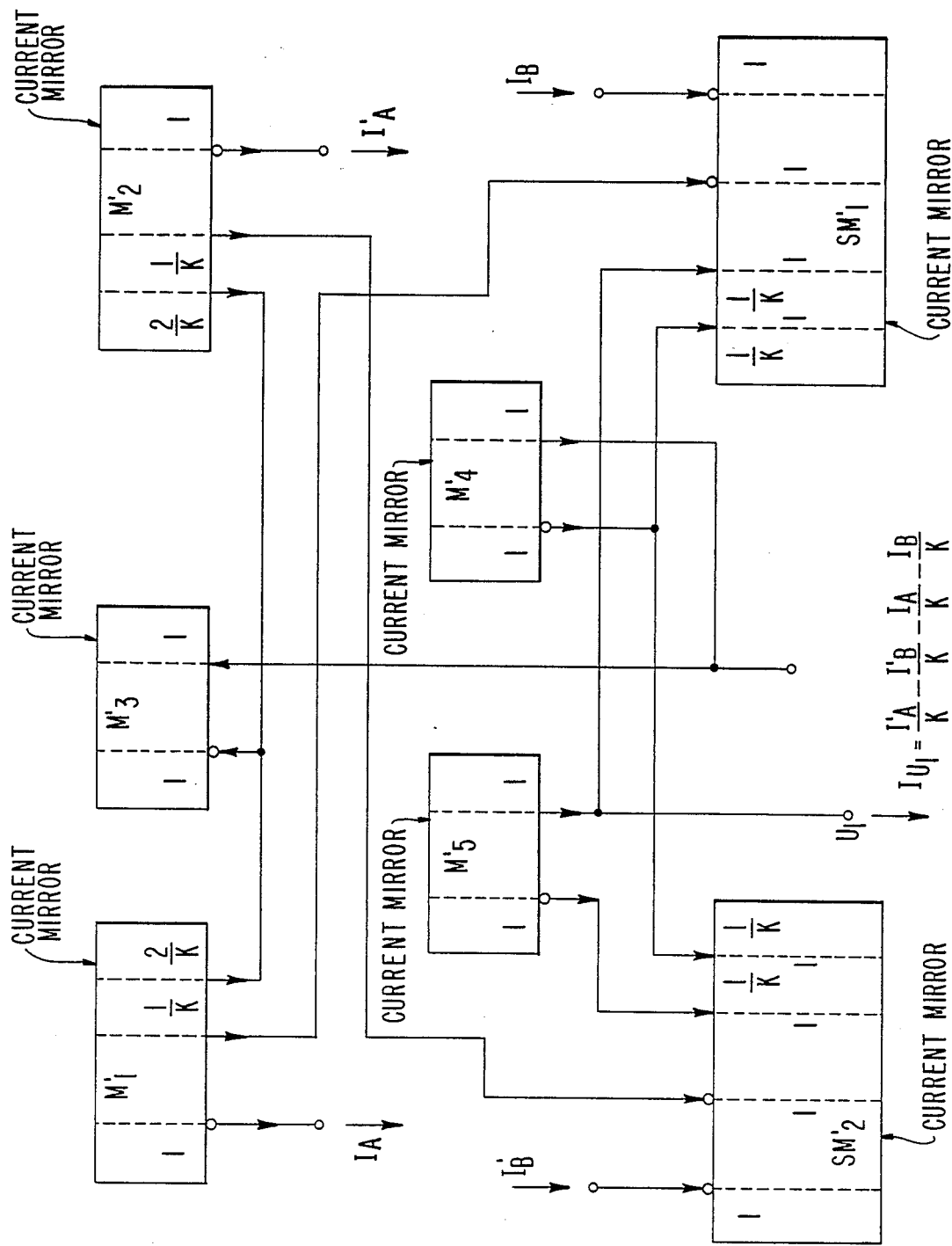
FIG. 5 illustrates the element A* of FIG. 4.

FIGS. 3–5 illustrate concrete examples of the current mirror $M_1$ and the coupling means CM and circuit C of FIG. 2 and the element A* of FIG. 4.

The operation of the examples illustrated in Figs. 3–5 could be easily discerned by one skilled in the art and a detailed description thereof has been omitted for the sake of brevity.

It is noted that the circuit of FIG. 5, that is, the circuit of element A*, is discussed in detail in copending U.S. patent application Ser. No. 841,789, filed Mar. 20, 1986 and commonly Assigned with respect to the present application.

The circuit coupling means CM is connected, as shown in FIG. 2, at a circuit node B to the input branch of the current mirror circuit $M_1$. The circuit CM causes an output current $I_F = I_L/K$ which is proportional to the current $I_L$ supplied to the line in accordance with a factor of proportionality $1/K$.

The operation of the circuit shown in FIG. 2 will now be described, designating the current flowing through the transistor $T_1$ by $I_1$, and the current flowing through the resistance $R_2$ by $I_2$ and the resultant current in the input branch of the current mirror circuit $M_1$ by $I_3$.

Since the potential of the inverting input is equal to that of the non-inverting input during operation of the operational amplifier $A_1$, the following is obtained:

$$I_2 = V_1/R_2$$

The following is produced at the nodes A and B respectively, observing the directions of the currents as shown in the Figure, as a result of Kirchhoff's law:

$$I_1 + n\, I_3 = I_2 = V_1/R_2 \quad [1]$$

$$I_1 = I_3 - I_F = I_3 - I_L/K \quad [2]$$

It then results from equations [1] and [2] that:

$$I_3 + n\, I_3 = V_1/R_2 + I_L/K$$

$$I_3 = 1/[1+n] \times V_1/R_2 + 1/[1+n] \times I_L/K$$

It is therefore possible to express the value of the voltage $V_0$ as a function of the line current $I_L$:

$$V_0 = R_0 \times I_3 = R_0/R_2 \times V_1/[1+n] + R_0/K[1+n] \times I_L \quad [3]$$

For a line current I equal to zero, the voltage $V_0$ has the value:

$V_{DROP} = R_0/R_2 \times V_1/[1+n]$, which may be predetermined at will by suitably selecting the resistances $R_0$ and $R_2$, and the voltage $V_1$ and the ratio n of amplification of the current mirror circuit $M_1$.

Equation [3] is, however, only valid when the transistor $T_1$ is conducting, and when $T_1$ is not conducting, i.e. when $I_1 = 0$, the following is produced at the node B:

$$I_3 - I_F = 0$$

from which the following may be directly obtained:

$$V_0 = R_0 \times I_3 = R_0/K \times I_L \quad [4]$$

The value $I_{LT}$ of the line current $I_L$ at which the transistor $T_1$ ceases to conduct is obtained by resolving the system formed by equations [3] and [4].

If the two equations are combined, the following is the case:

$$R_0/R_2 \times V_1/[1+n] + R_0/K[1+n] \times I_L = R_0/K \times I_L$$

$$[R_0(1+n) - R_0]/K(1+n) \times I_L = R_0/R_2 \times V_1/[1+n]$$

$$I_L = KV_1/[R_2 \times n] = I_{LT}.$$

This value $I_{LT} = KV_1/[R_2 \times n]$ is predetermined when the value $V_{DROP}$ is predetermined and the factor of proportionality $1/K$ is selected between the currents $I_F$ and $I_L$.

The voltage $V_L$ supplied to the subscriber's telephone line connected to the circuit coupling means CM is equal to the supply voltage $V_{BAT}$ between the two terminals $+V_{cc}$ and $-V_{cc}$ of the supply voltage generator less the voltage $V = V_0$ supplied by the voltage generator contained in the circuit coupling means CM.

The characteristic current $I_L$—voltage $V_L$ is exactly defined as shown in FIG. 1.

The first section of this characteristic, from $I_L = 0$ to $I_L = I_{LT}$, corresponds in effect to a section of the straight line having the equation:

$$V_L = V_{BAT} - V_{DROP} - R/K[1+n] \times I_L,$$

obtained from equation [3].

The second section of this characteristic corresponds to a section of the straight line having the equation:

$$V_L = V_{BAT} - R_0/K \times I_L$$

obtained from equation [4].

The different slopes of the two sections of the characteristic, which correspond to the two different values of the impedance present on the line, are determined solely by the factor of proportionality $1/[1+n]$.

Although a single embodiment of the invention has been described and illustrated, it is evident that many variants are possible without departing from the scope of the invention.

The transistor $T_1$ could, for example, be of a different type and, by suitably changing the polarities of the voltages, all the current flows could be inverted with respect to those shown in FIG. 2.

The resistances $R_2$ and $R_0$ could be connected to different voltage references.

In order to balance the subscriber's telephone line perfectly from the electrical point of view, it would be possible to insert a second voltage generator V controlled by the voltage $V_0$ produced at the terminals of the resistance $R_0$ in the circuit coupling means CM, between the telephone line and the supply, and symmetrically with respect to the generator already discussed. In this case, of course, the overall voltage generator by the two identical generators should still be equivalent to that supplied by the single voltage generator.

Finally, it would be possible, without departing from the scope of the invention, to insert a current limiter, operating at threshold, and designed to chop the characteristic before it reaches the current value $I_{LM}$.

We claim:

1. A monolithically integratable telephone circuit for feeding a subscriber's telephone line, comprising:

a current mirror circuit having an input and first and second outputs; a transistor having first, second and control terminals; an operational amplifier having an output terminal and first and second input terminals;

wherein said input of said current mirror circuit is connected to said second terminal of said transistor; said control terminal of said transistor is connected to said output terminal of said operational amplifier; said first terminal of said transistor is connected to said second input terminal of said operational amplifier and is connected to a voltage reference via a first resistance; said first input terminal of said operational amplifier is connected to said voltage reference via a voltage generator; said first output of said current mirror circuit is connected to said second input terminal of said operational amplifier and said second output of said current mirror circuit is connected to said voltage reference via a second resistance;

said circuit further comprising a circuit means for coupling said subscriber's telephone line to a supply voltage generator having first and second terminals, said circuit means having first and second terminals connected to said first and second terminals of said supply voltage generator and having third and fourth terminals connected to a first and second wire respectively of said subscriber's line; said circuit coupling means comprising at least one additional voltage generator for outputting a voltage in accordance with a resultant voltage across said second resistance, and a circuit current transducer means, inserted between at least one of the first and second terminals of said circuit means which is connected to said subscriber's telephone line and said input of said current mirror circuit.

* * * * *